(12) United States Patent
Boland

(10) Patent No.: US 8,327,499 B2
(45) Date of Patent: Dec. 11, 2012

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 363 days.

(21) Appl. No.: 12/727,683

(22) Filed: Mar. 19, 2010

(65) Prior Publication Data
US 2010/0251501 A1 Oct. 7, 2010

(30) Foreign Application Priority Data

Mar. 30, 2009 (EP) .................................. 09156718

(51) Int. Cl.
A47L 1/00 (2006.01)
(52) U.S. Cl. .................................. 15/250.201; 15/250.4
(58) Field of Classification Search ............. 15/250.201, 15/250.4, 250.452, 250.48
See application file for complete search history.

(56) References Cited

U.S. PATENT DOCUMENTS

| | | | | |
|---|---|---|---|---|
| 3,116,510 A | * | 1/1964 | Oishei et al. | 15/250.201 |
| 3,320,628 A | * | 5/1967 | Gottlob et al. | 15/250.201 |
| 3,636,583 A | * | 1/1972 | Rosen | 15/250.48 |
| 5,564,157 A | * | 10/1996 | Kushida et al. | 15/250.201 |
| 5,862,567 A | * | 1/1999 | Kim | 15/250.201 |
| 7,228,588 B2 | * | 6/2007 | Kraemer et al. | 15/250.201 |
| 7,568,258 B2 | * | 8/2009 | Jeuffe | 15/250.48 |
| 2010/0218333 A1 | | 9/2010 | Ritt | |
| 2012/0054977 A1 | * | 3/2012 | Boland | 15/250.33 |

FOREIGN PATENT DOCUMENTS

| | | |
|---|---|---|
| DE | 19827032 A1 | 12/1998 |
| DE | 19745006 A1 | 4/1999 |
| DE | 102005054142 A1 | 5/2007 |
| EP | 1964733 A | 9/2008 |
| EP | 1964733 A1 | 9/2008 |
| GB | 2005532 A | 4/1979 |

* cited by examiner

Primary Examiner — Basil Katcheves
(74) Attorney, Agent, or Firm — Robert L. Stearns; Dickinson Wright, PLLC

(57) ABSTRACT

A windscreen wiper device includes an elastic, elongated carrier element, as well as an elongated wiper blade of a flexible material. The wiper blade includes a wiping element which can be placed in abutment with a windscreen to be wiped, which wiper blade includes a central longitudinal groove, in which groove a longitudinal strip of the carrier element is disposed. The windscreen wiper device includes a connecting device for an oscillating arm, wherein the oscillating arm is pivotally connected to the connecting device about a pivot axis near one end thereof. The wiping element is movable in a direction at least substantially perpendicular to a windscreen to be wiped, dependent on the pressure exerted by the longitudinal strip on the wiper blade.

5 Claims, 2 Drawing Sheets

WINDSCREEN WIPER DEVICE

Figure 1:
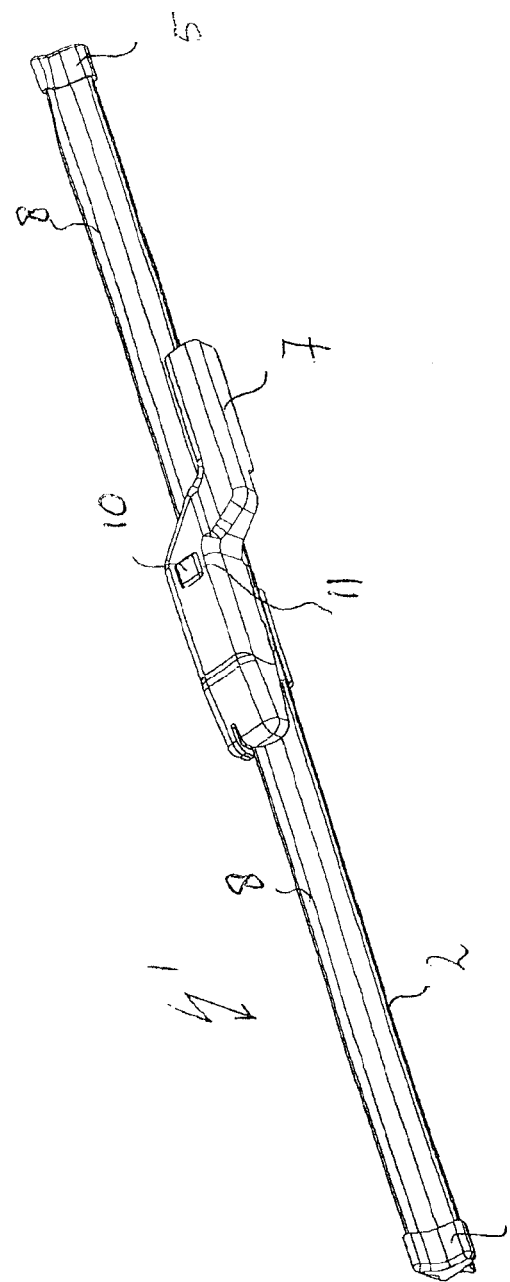
Figure 1:
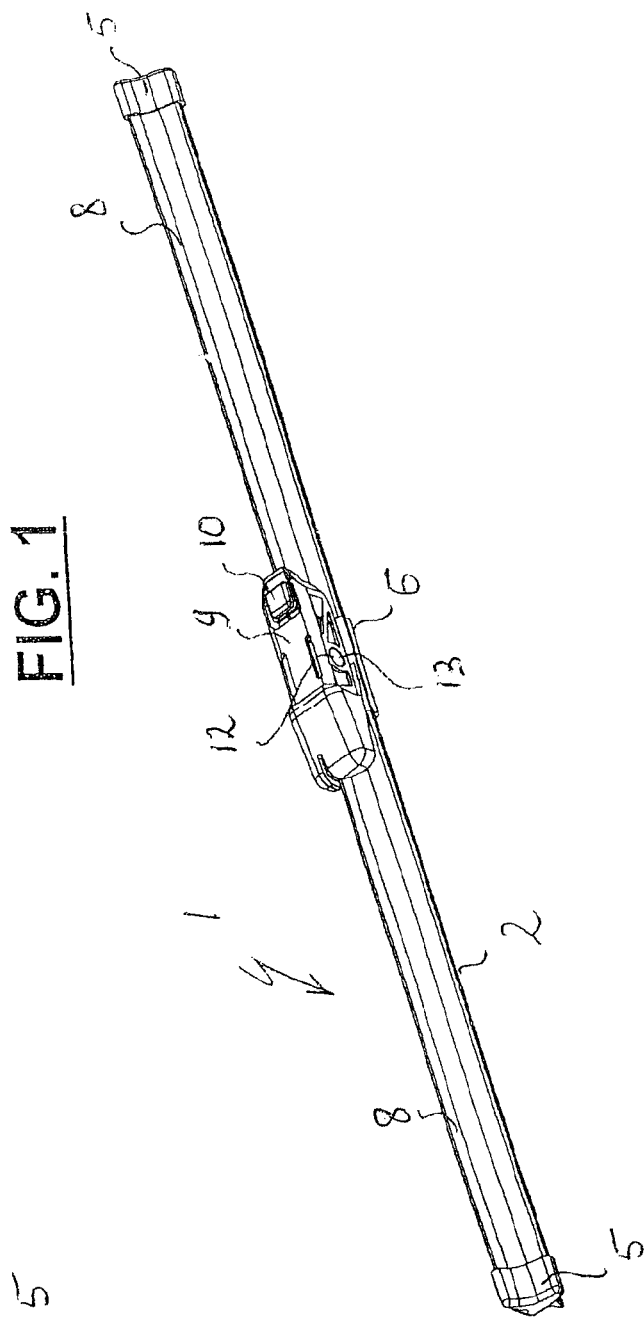

This application claims priority to European Application Serial No. 09156718, filed Mar. 30, 2009, and is incorporated herein by reference.

BACKGROUND OF THE INVENTION

1. Technical Field

The present invention relates to a windscreen wiper device comprising an elastic, elongated carrier element, as well as an elongated wiper blade of a flexible material, the wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end thereof.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biassed by the carrier element, as a result of which it exhibits a specific curvature.

SUMMARY OF THE INVENTION

The object of the invention is to provide an improved windscreen wiper device.

In order to accomplish that objective, a windscreen wiper device of the type referred to in the introduction is characterized according to the invention in that the wiping element is movable in a direction at least substantially perpendicular to a windscreen to be wiped, dependent on the pressure exerted by the oscillating arm on the wiper blade. First of all, the present windscreen wiper device can be used for large varieties of windscreens to be wiped mutually differing in their curvatures, as variation of the position of the wiping element perpendicular to a windscreen to be wiped may compensate these differences in curvature. Secondly, any tolerances in windscreen shapes may thus be compensated.

In a preferred embodiment of a windscreen wiper device in accordance with the invention the wiping element is resilient between a first position facing away from the longitudinal strip and a second position facing towards the longitudinal strip. Particularly, the wiping element is in the first position at a pressure A exerted by the longitudinal strip on the wiper blade, wherein the wiping element is in the second position at a pressure B exerted by the longitudinal strip arm on the wiper blade, and wherein pressure A is smaller than pressure B.

In another preferred embodiment of a windscreen wiper device according to the invention the groove extends in downward direction beneath the longitudinal strip for forming a longitudinal hollow channel defined by the longitudinal strip and a bottom of the groove.

In another preferred embodiment of a windscreen wiper device in accordance with the invention the bottom is flexible. Preferably, the bottom is provided with stop surfaces on opposite sides of the wiping element, wherein the stop surfaces limit an oscillatory movement of the wiping element in the second position. The advantage is that the so-called "reversal noise" of the wiping element during the oscillatory movement is reduced.

In another preferred embodiment of a windscreen wiper device according to the invention the groove extends in upward direction above the longitudinal strip for forming a longitudinal hollow channel defined by the longitudinal strip and an upper surface of the groove.

In another preferred embodiment of a windscreen wiper device in accordance with the invention the wiper blade is provided with a spoiler at a side thereof facing away from a windscreen to be wiped.

THE DRAWINGS

The invention will now be explained more in detail with reference to figures illustrated in a drawing, wherein FIG. 1 is a perspective, schematic view of a preferred embodiment of a windscreen wiper device according to the invention, with and without an oscillating arm, respectively; and FIGS. 2 through 5 show several cross-sectional views of a wiper blade as used in a windscreen wiper device of FIG. 1.

DETAILED DESCRIPTION

FIG. 1 shows a preferred variant of a windscreen wiper device 1 according to the invention. The windscreen wiper device is built up of an elastomeric wiper blade 2 comprising a central or middle longitudinal groove 3, wherein a central or middle longitudinal strip 4 made of spring band steel is fitted in the longitudinal groove 3 (see FIGS. 2 through 5). The strip 4 forms a flexible carrier element for the rubber wiper blade 2, as it were, which is thus biassed in a curved position (the curvature in operative position being that of a windscreen to be wiped). An end of the strip 4 and/or an end of the wiper-blade 2 is connected on either side of the windscreen wiper device 1 to respective connecting pieces or "end caps" 5. In this embodiment, the connecting pieces 5 are separate constructional elements, which may be form-locked, as well as force-locked to both ends of the strip/4 the wiper blade. In another preferred variant, the connecting pieces 5 are in one piece with the strip 4 made of spring band steel. The windscreen wiper device 1 is furthermore built up of a connecting device 6 for connecting an oscillating wiper arm 7 thereto. The oscillating wiper arm 7 is pivotally connected to the connecting device 6 about a pivot axis near one end. The preferred embodiment of FIG. 1 according to the invention comprises a spoiler or "air deflector" 8 which is made in one piece with the rubber wiper blade 2 and which extends along the entire length thereof. The connecting device 6 with the wiper blade 2 is mounted onto the oscillating arm 7 as follows. A joint part 9 being already clipped onto the connecting device 6 is pivoted relative to the connecting device 6, so that the joint part 9 can be easily slided on a free end of the oscillating arm 7. During this sliding movement a resilient tongue 10 of the joint part 9 is initially pushed in against a spring force and then allowed to spring back into the hole 11 of the oscillating arm 7, thus snapping, that is clipping the resilient tongue 10 into the hole 11. This is a so-called bayonet-connection. The oscillating arm 7 together with the joint part 9 may then be pivoted back in a position parallel to the wiper blade 2 in order to be ready for use. By subsequently pushing in again the resilient tongue 10 against the spring force (as if it were a push button), the connecting device 6 and the joint part 9 together with the wiper blade 2 may be released from the oscillating arm 7. Dismounting the connecting device 6 with the wiper blade 2 from the oscillating arm 7 is thus realized by sliding the connecting device 6 and the joint part 9 together with the wiper blade 2 in a direction away from the oscillating arm 7. The connecting device 6 comprises two cylindrical protrusions 12 extending outwards on either side of the connecting device 6. These protrusions 12 pivotally engage in identically shaped cylindrical recesses 13 of the plastic joint part 9. The protrusions 12 act as bearing surfaces at the location of the pivot axis in order to pivot the joint part 9 (and the oscillating arm 7 attached thereto) about the pivot axis near one end of the oscillating arm 7.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

With reference to FIGS. 2 through 5 the wiper blade 2 comprises a wiping element 14. The wiping element 14 consists of two tilting web grooves 15 defining a strip-like tilting web 16 between them, as well as a downwardly extending wiping lip 17 on the tilting web 16. The wiping lip 17 rests with its free end on a windscreen to be wiped. In action the wiping lip 17, as if it were a hinge, tilts in its oscillation reversal positions.

Figures 2, 3, 4, 5:
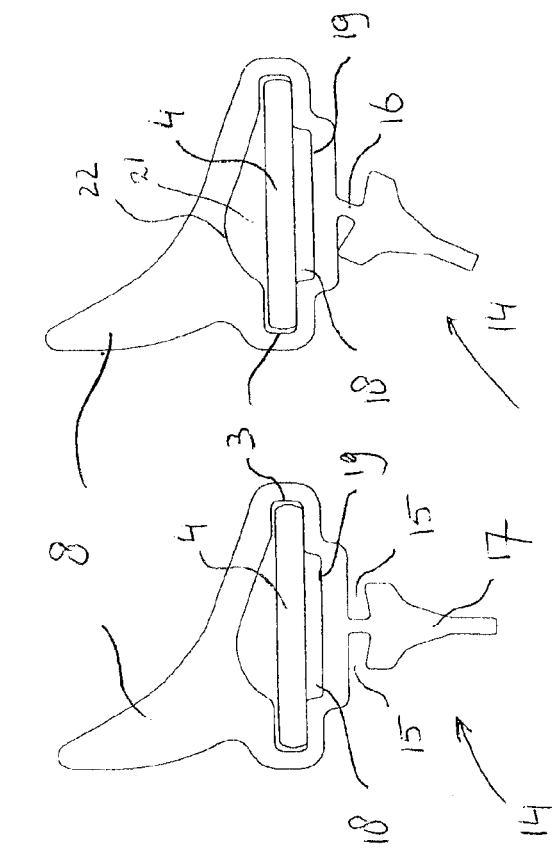

FIGS. 2 and 3 refer to a cross-sectional view of the wiper blade 2 in case a relatively low pressure is exerted by the oscillating arm 7, that is the longitudinal strip 4 on the wiper blade 2. The magnitude of the pressure is dependent, for example, on the curvature of a windscreen to be wiped, the curvature of the longitudinal strip 4, as well as on the force of a spring mounted between the mounting head and the oscillating arm 7. The wiping element 14 is in that case in a first position facing away from the longitudinal strip 4 (see FIG. 2). The wiping element 14 is allowed to follow its normal oscillatory movement (see FIG. 3).

As can be seen in FIGS. 2 through 5, the central groove 3 extends in downward direction beneath the longitudinal strip 4 for forming a longitudinal hollow channel 18 defined by the longitudinal strip 4 and a bottom 19 of the groove 3. The cross-sectional view of the wiper blade 2, as shown in FIGS. 4 and 5, refers to a situation when a relatively high pressure is exerted by the longitudinal strip 4 on the wiper blade 2. In that particular case the wiping element 14 is forced into a second position facing towards the longitudinal strip 4 (see FIG. 4). In other words, due to the resiliency of the bottom 19 of the groove 3, the wiping element 14 is allowed to move in a direction perpendicular to a windscreen to be wiped, dependent on the pressure exerted by the longitudinal strip 4 on the wiper blade 2, that is a relatively low pressure A in FIGS. 2 and 3, as well as a relatively high pressure B in FIGS. 4 and 5. In the second position of the wiping element 14 (see FIGS. 4 and 5) the bottom 19 is provided with stop surfaces 20 on opposite sides of the wiping element 14 to limit the oscillatory movement of the wiping element 14 in the second position.

The central groove 3 also extends in upward direction above the longitudinal strip 4 for forming a longitinal hollow channel 21 defined by the longitudinal strip 4 and an upper surface 22 of the groove 3. This is realized for facilitating insertion of the longitudinal strip 4 inside the groove 3 and for reducing the amount of raw material used in order to minimize costs and weight.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper blade of a flexible material, the wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, wherein the wiping element is movable relative to said longitudinal strip of said carrier element in a direction at least substantially perpendicular to a windscreen to be wiped, dependent on the pressure exerted by the longitudinal strip on the wiper blade, and wherein said groove extends in a downward direction beneath the longitudinal strip to form a longitudinal hollow channel defined by said longitudinal strip and a bottom of said groove, wherein said bottom is flexible, and wherein said wiping element is allowed to move relative to said longitudinal strip of said carrier element in a direction perpendicular to a windscreen to be wiped, dependent on the pressure exerted by the longitudinal strip on the wiper blade due to the resiliency of said bottom.

2. A windscreen wiper device according to claim 1, wherein the wiping element is resilient between a first position facing away from the longitudinal strip and a second position facing towards the longitudinal strip.

3. A windscreen wiper device according to claim 2, wherein the wiping element is in the first position at a pressure A exerted by the longitudinal strip on the wiper blade, wherein the wiping element is in the second position at a pressure B exerted by the longitudinal strip on the wiper blade, and wherein pressure A is smaller than pressure B.

4. A windscreen wiper device according to claim 1, wherein the groove also extends in upward direction above the longitudinal strip for forming a longitudinal hollow channel defined by the longitudinal strip and an upper surface of the groove.

5. A windscreen wiper device according to claim 4, wherein the wiper blade is provided with a spoiler at a side thereof facing away from a windscreen to be wiped.

* * * * *